No. 888,140.
PATENTED MAY 19, 1908.
V. BIELA.
HAY PRESS.
APPLICATION FILED NOV. 14, 1907.
3 SHEETS—SHEET 1.
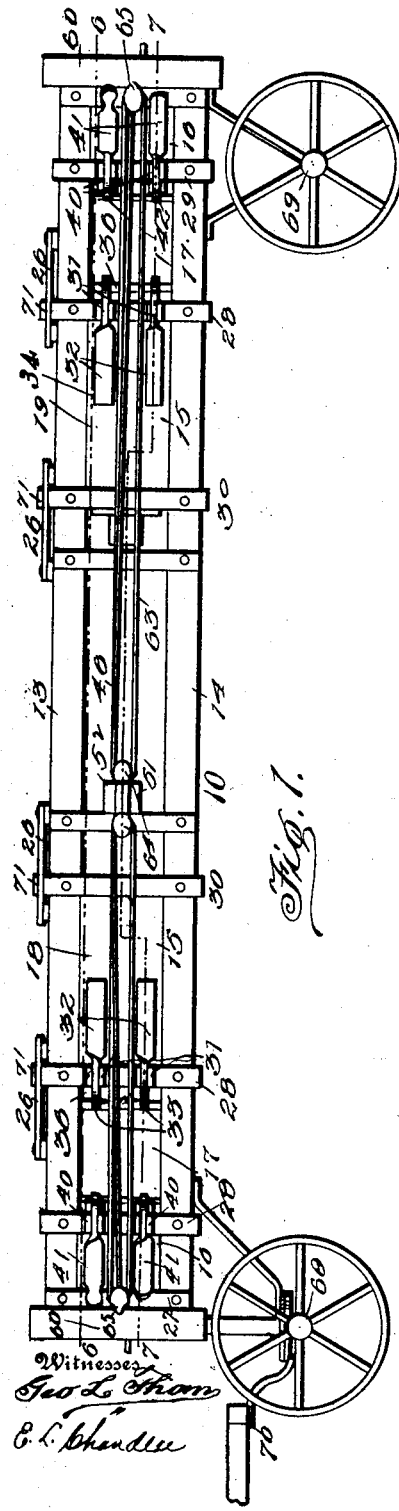
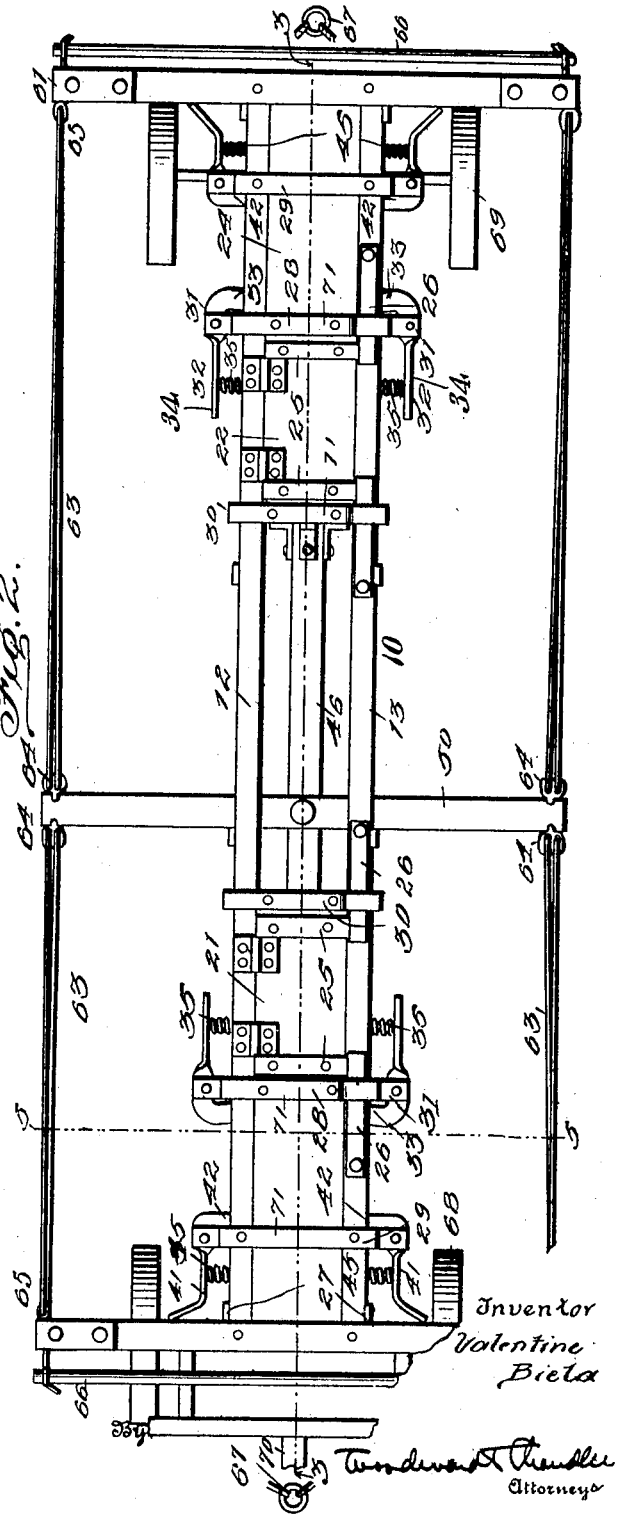

No. 888,140. PATENTED MAY 19, 1908.
V. BIELA.
HAY PRESS.
APPLICATION FILED NOV. 14, 1907.
3 SHEETS—SHEET 2.
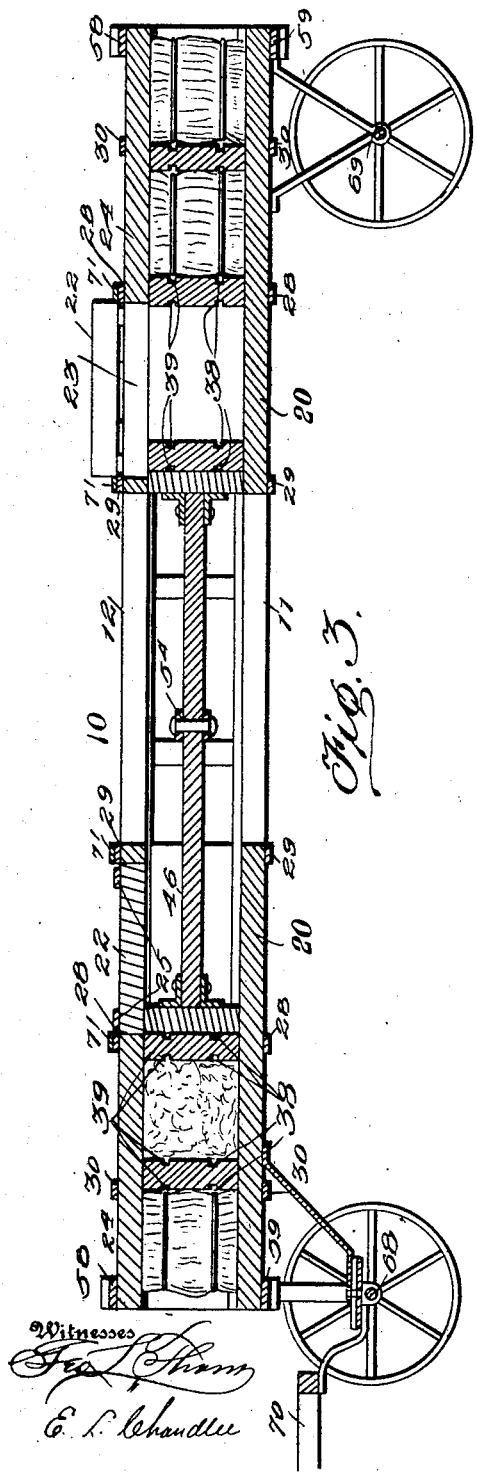
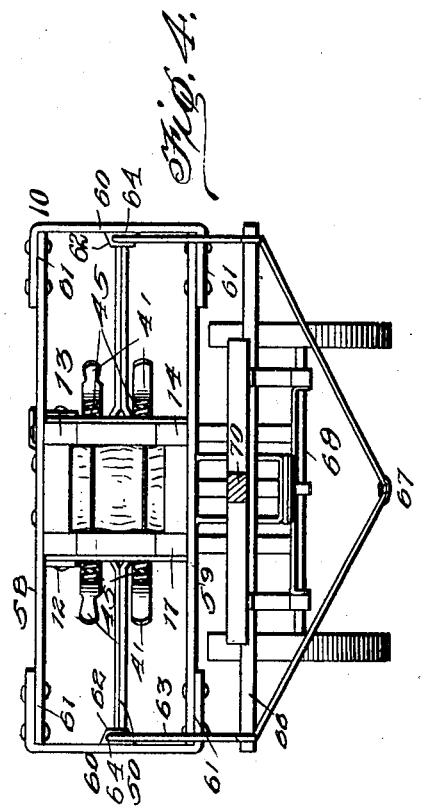
Inventor
Valentine Biela
Witnesses
By
Attorneys No. 888,140.
PATENTED MAY 19, 1908.
V. BIELA.
HAY PRESS.
APPLICATION FILED NOV. 14, 1907.
3 SHEETS—SHEET 3.
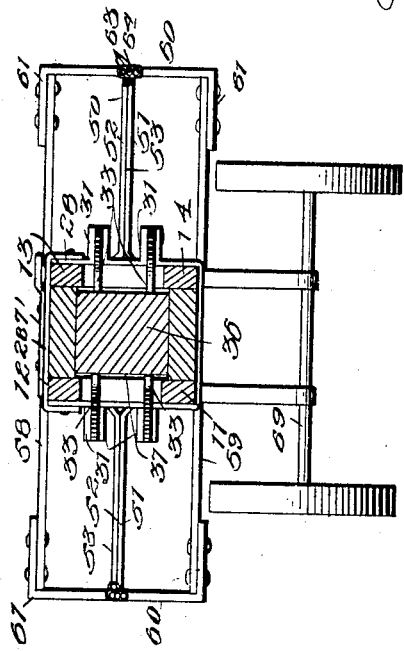
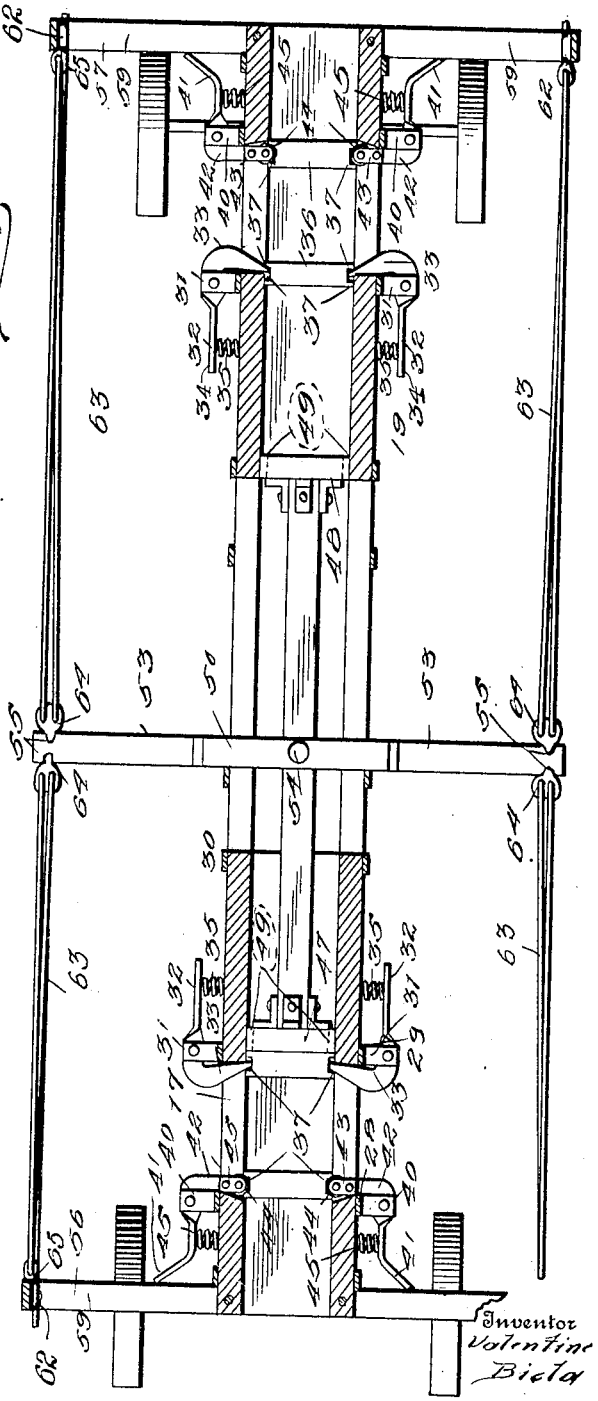

UNITED STATES PATENT OFFICE.

VALENTINE BIELA, OF PANNA MARIA, TEXAS.

HAY-PRESS.

No. 888,140.  Specification of Letters Patent.  Patented May 19, 1908.

Application filed November 14, 1907. Serial No. 402,182.

*To all whom it may concern:*

Be it known that I, VALENTINE BIELA, a citizen of the United States, residing at Panna Maria, in the county of Karnes and State of Texas, have invented certain new and useful Improvements in Hay-Presses, of which the following is a specification.

This invention relates to the class of presses, and more particularly to hay presses, and has for its object to provide a press of this character including a reciprocating plunger, the same having plunger heads and arranged to work in separate compressing chambers at each end of the press.

A further object of this invention is to provide a press of this character in which the plunger may be reciprocated by means of draft animals, arrangement being made whereby the animals may operate the plunger in a direct line from the compressing chambers.

A further object of this invention is to provide means whereby a reciprocating plunger having plunger heads at each end thereof and arranged to reciprocate in separate compressing chambers may be operated upon by a single draft animal and from one point of the press.

A further object of this invention is to provide a press with means whereby a bale may be compressed during the tying operation of a preceding bundle.

A further object of this invention is to provide a press including plunger operating mechanism which may be operated by draft animals and without injury to said animals.

A further object of this invention is to provide means whereby hay may be pressed into bales of equal sizes.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a side elevational view of the press, Fig. 2 is a top plan view, Fig. 3 is a vertical longitudinal sectional view on the line 3—3 of Fig. 2, Fig. 4 is an end view, Fig. 5 is a vertical cross sectional view on the line 5—5 of Fig. 2, Fig. 6 is a horizontal sectional view on the line 6—6 of Fig. 1.

Referring now to the drawings there is shown a baling press 10 which consists of longitudinally extending beams 11, 12, 13 and 14 respectively, and these beams have a portion at each end and at the side thereof closed by blocks 15 and 16 respectively and these blocks are arranged with their inner ends in spaced relation, as shown, to provide an opening 17, the purpose of this opening will hereinafter appear. It will thus be seen that the closed sides at each end of the press serve as an independent compressing chamber 18 and 19. The chambers 18 and 19 are each provided with a flooring 20. Doors 21 and 22 are hinged to the beam 12, and these doors are thus arranged to close the feed openings 23, which are formed in the roof 24 of each chamber. The doors are provided with outwardly extending bars 25 which extend beyond the outer edge of the beam 13, and these bars are thus arranged for engagement by levers 26 which are pivoted to the beam 13.

The beams 11, 12, 13 and 14 are connected by vertically extending brace rods 27. Straps 28 and 29 respectively are arranged to encircle the beams 11, 12, 13 and 14, and these straps are preferably arranged at each end of the blocks 16. Similar straps 30 are also arranged to encircle the beams 11, 12, 13 and 14, and these straps are arranged adjacent the inner ends of the blocks 15.

The straps 28 are provided with outwardly extending ears 31 which project from each side of the press 10 and adjacent the openings 17. Levers 32 are pivoted between each pair of these ears, and these levers consist of inwardly directed bills 33 which are arranged to extend within the chambers 18 and 19 and through the opening 17, and the ends of these levers outwardly of their pivotal points are flattened as shown at 34, and these flattened portions of the levers are normally held at the outwardlimit of their movement by springs 35. The springs 35 are secured to the blocks 16, as shown. Each chamber 18 and 19 is provided with four of such levers. These levers are thus arranged for engagement with header blocks 36.

The header blocks 36 consist of vertically extending grooved portions 37 which are arranged to receive the inwardly projecting bills of the levers 32, and these blocks are further provided with horizontally extending grooves 38 and 39 which are formed in each of the faces of the block in alinement with the grooves 37. The purpose of these grooves will be more fully set forth as the nature of the invention is more fully described. Outwardly extending ears 40 are carried by the straps 30 and these ears are also arranged adjacent the opening 17 and extend outwardly from the blocks 15. Levers 41 are pivotally mounted between these ears and these levers are provided with portions 42 which project inwardly of the openings 17 and into the chambers 18 and 19 respectively. These levers have their inner ends forked as shown at 43, and arranged between these forked portions of the lever there are shown revoluble wheels 44. Each of the chambers 18 and 19 are provided with four of such levers, and it may be stated that the upper two levers of each set are to be used as hand levers, and the lower of each of these sets are to be used as foot levers. It will thus be seen that each chamber 18 and 19 is provided with four automatically arranged levers at the inner ends which are arranged for engagement with the header blocks 36. Springs 45 are secured to the blocks 15, and these springs are arranged for engagement with the levers 41 for holding these levers with their innner ends within the chambers 18 and 19.

A reciprocatory plunger 46 is arranged between the beams 11, 12, 13 and 14, and this plunger is provided with heads 47 and 48 which are arranged to reciprocate within the chambers 18 and 19. These heads are provided with horizontally disposed notches 49, and these notches are arranged to pass over the bills 33 of the levers 32 after the compression of a bale. An outwardly extending lever 50 is carried by the plunger 46, and this lever consists of the bars 51 and 52 which are arranged above and below the plunger 46, and these bars have portions 53 which project at either side of the press 10. This bar is pivoted to the plunger by means of a bolt 54 to allow perfect freedom of the plunger. Clevises 55 are carried at the outer ends of each of the portions 53 of the levers 50 and these clevises are arranged to extend toward each of the chambers 18 and 19.

Yokes 56 and 57 are arranged at each end of the press 10, and these yokes consist of the horizontally extending bars 58 and 59 which extend outwardly and at each side of the press, as shown. The bars 58 being secured to the beams 12 and 13 of the press and the bars 59 are secured to the under side of the beams 11 and 14 of the press. The outer ends of each of these bars 58 and 59 are connected by vertically extending bars 60 which have their upper and lower ends bent at right angles as shown at 61, and these portions 61 are thus arranged for engagement with the bars 58 and 59. Pulleys 62 are secured between the bars 58 and 59 and at each end of the bars, and these pulleys are arranged to receive a flexible connection 63 which is passed over a tackle block 64 which is carried by each of the clevises 55. The free end of the flexible connection is secured to a pulley 65 which is supported by the portions 60 of the yokes 56 and 57. This pulley also receives a portion of the flexible connection from the tackle block 64. The ends of the flexible connection outwardly of the pulleys 62 are connected to a cross bar 66, and this connection outwardly of the bar is connected to a draft ring 67.

The press 10 is preferably mounted upon wheeled trucks 68 and 69, and the forward truck is connected to an outwardly extending tongue 70. This tongue is thus arranged for attachment of draft animals when it is desired to transport the press.

The yokes 28 and 29 have secured upon their upper faces plates 71, and these plates have their outer ends upturned as shown, and these upturned portions are thus arranged to receive the levers 26 when it is desired to hold the doors 21 in a closed position. The levers being arranged to engage the outwardly extending portions of the bars 26.

From the foregoing description, it will be understood that draft animals are connected with the rings 67, and after the chambers 18 and 19 have been filled with material to be pressed into bales the draft animals are allowed to move in a direction away from the press, and in this movement of the animal it will be seen that the plunger 46 will be operated to compress material within the chambers 18 and 19. The header blocks 36 will of course be engaged by the bills 33 of the lever 32, and after the bale has been compressed within one or the other of the chambers 18 or 19 the header blocks will become disengaged from the bills 33, and these header blocks will then be moved toward the ends of one or the other of these chambers, and in this movement of the blocks it will be engaged by the portions 42 of the levers 41, the rollers 44 being disposed within the grooves 37. It will thus be seen that a bale is pushed from its compressing chamber to a point in line with the openings 17, and after the bale has assumed this position, a second header block is placed within the compression chamber and this header block is thus arranged for engagement by the levers 32. The two header blocks being arranged at either side of the bale, it will be seen that the tie wire may be inserted through the horizontally disposed grooves 38 and 39 and a bale is thus completed. When it is desired to release a completed bale the levers 41 are disengaged from the grooves 37 which are formed in the header blocks, and in the movement of the plunger within the chamber it will be seen that the finished bale will be pushed outwardly of the press.

From the construction and arrangement of draft connections it will be seen that the arrangement of said connection may be changed to bring both ends of said connections at one point of the press, and it will be apparent that the plunger may be operated by a single draft animal and from one end of the press.

What is claimed is:

1. A baling press comprising independent compressing chambers, a reciprocatory plunger having heads arranged within said chambers, header blocks arranged within the chambers, levers carried by the press for engagement at times with the header blocks, and levers carried by the press to receive the header blocks after the compression of a bale within the compressing chambers.

2. A baling press comprising independent compressing chambers, a reciprocatory plunger having heads arranged within said chambers, header blocks arranged within the chambers, levers carried by the press for engagement at times with the header blocks, levers carried by the press to receive the header blocks after a bale has been compressed and operating mechanism for the plunger.

3. A baling press comprising independent compressing chambers, a reciprocatory plunger having heads arranged within the chambers, a lever pivotally connected to the plunger, flexible draft connections carried by the lever, header blocks removably disposed within the chambers, pivoted levers carried by the press and engaged with the blocks, and pivotally mounted header-block receiving levers located adjacent the first named levers.

In testimony whereof I affix my signature, in presence of two witnesses.

VALENTINE BIELA.

Witnesses:
J. A. LORENZ,
PETER KASPRZIK.